Patented Jan. 24, 1928.

1,657,379

UNITED STATES PATENT OFFICE.

ALBERT K. EPSTEIN, OF CHICAGO, ILLINOIS.

PROCESS FOR MANUFACTURING LEAVENED BREAD.

No Drawing.  Application filed December 14, 1925. Serial No. 75,440.

My invention relates to a new process of manufactured leavened bread which has certain advantages in that economy of time in fermentation can be effected, or a saving in the amount of yeast, and an improvement in the quality of the finished bread.

In the manufacture of leavened bread a dough is prepared by kneading together flour, sodium chloride, water, yeast and sugar. Other baking accessories may be added such as milk, fatty substances, dextrinous material, malt extract and mineral salts. When the materials entering into the dough are kneaded together the dough is then subjected to a process of fermentation. There are two general methods used in fermenting dough; the straight dough process, and the sponge process.

In the straight dough process, all the ingredients entering into a given batch are mixed together and allowed to lie in a warm place at about 80° F. to ferment. As the fermentation proceeds, carbon dioxide is formed which raises the dough. When the volume of the dough reaches a certain height it is punched down to liberate the gas and the dough assumes approximately its original volume. This operation of allowing the dough to rise, and subsequent punching may be repeated several times. The dough is then ready to be cut into loaves and molded.

In the sponge process, more than half the water is mixed with about half of the flour, and yeast, and allowed to ferment until the dough in the trough reaches a certain height. This dough is then mixed with the remainder of the flour, water and other baking ingredients.

Whether the dough has been fermented by the straight dough process or by the sponge process it is cut and molded into loaves after the fermentation, and allowed to undergo further maturing in a proof box, at a higher temperature ranging from 90° to 100° F. In some bake shops the proofing temperature is higher. It is then placed in the oven and baked.

The total fermentation period required to bring a dough to a proper state of maturity so that it will be ready to go into the oven, depends upon various factors, such as the type of flour, the amount of salt, the temperature of fermentation, the amount of yeast, the amount of sugar or enzyme substances forming sugar assimilable by yeast, and other baking accessories which may be present.

For a given set of conditions the baker determines what his fermentation period should be to get the best bread. The amount of yeast required to bring about a dough to the proper maturity also depends upon the above enumerated conditions and upon the time of fermentation. If all the conditions are constant, it is possible to ferment a given dough batch within a given time period, to obtain the best finished product. If the time period is increased the amount of yeast may be diminished to get the same results.

I have discovered a new nitrogen yeast food which, when added to a dough batch containing yeast and sufficient available carbohydrate, will stimulate and hasten the processes of fermentation, producing a bread of large volume and well aerated. This nitrogen yeast food has other advantages which will be more fully discussed.

In the manufacture of leavened bread the yeast plays an important part. It produces carbon dioxide gas which raises and aerates the bread. As a result of the life processes which the yeast carries on in the dough, certain by-products are produced which mature and condition the gluten, giving to the dough, properties of extensibility and resiliency. This physical change taking place during fermentation is important as it makes it possible for the carbon dioxide gas formed to extend the dough and render it porous and cellular.

In carrying out my invention a watersoluble substance containing organic nitrogen is used. To this class of substances belongs carbamid, having the chemical formula $CO(NH_2)_2$. This substance is white and crystalline in nature, water soluble and has a melting point of 132° C. In the course of fermentation, the yeast will assimilate the nitrogen, changing it into the complex protein of their cells, thus enhancing their life processes in the dough batch. In the course of metabolism of carbamid, carbon dioxide is given off which is also produced by the fermentation of the sugar of the dough by the yeast enzymes.

The novel feature of this invention consists in adding a water soluble substance containing organic nitrogen as a yeast food to a dough batch, and while the yeast metabolizes the nitrogen, the end products of metabolism are such as do not materially affect the strength of the gluten.

In order to carry out my invention, I add to the dough batch containing 100 pounds of flour, ½ ounce of carbamid and an amount of yeast usually insufficient to ferment and mature a given dough batch in a given time period. For example in a three hour dough, about two percent of yeast would be ordinarily sufficient to produce the proper fermentation, although I can use less yeast to accomplish the same result. The dough must contain sufficient available carbohydrates for the yeast to carry on its life processes during the entire fermentation period, or it must contain sufficient enzymes to make the carbohydrate material of the flour available for the yeast life if there is a deficiency in readily available carbohydrates in the dough batch.

Thus, the use of suitable quantities of carbamid in a dough batch, containing sufficient carbohydrates, makes possible the saving of yeast if it is desired that the given dough batch be fermented in a given time.

The invention can also be carried out by adding to a dough batch containing 100 pounds of flour, the usual amount of yeast, ½ ounce of carbamid, and sufficient available carbohydrates or enzyme substances capable of producing available carbohydrates for the yeast, and fermenting the batch a shorter period of time than is usually required. Thus, by carrying out the process by this method, a saving of time is effected which is of great importance in modern bake shop practice.

I do not limit myself to the above specified quantity of carbamid. Any suitable quantity which will accomplish the above results comes within the scope of my patent.

The invention can also be practiced in combination with the addition to the dough batch of mineral salts of calcium or magnesium, which have a binding action on the gluten and a stimulating effect upon the yeast, and also in combination with stimulating agents upon yeast activity such as water soluble chlorates, and other oxidizing compounds. In this case the effect upon the yeast saving, or upon the time saving in fermentation of the dough, and the effect upon the finished bread is greater than when carbamid is used by itself.

Thus, good results are obtained by adding to a dough batch containing 100 pounds of flour, sufficient available carbohydrates for the yeast to carry on their life processes, or sufficient enzyme substances to furnish available carbohydrates from the starchy materials; ½ ounce carbamid, 1.5 ounces of calcium sulphate, and 0.032 ounces of potassium chlorate. An amount of yeast is added less than is usually required to be added to the given dough batch, and the dough is fermented the given time period, and baked into bread.

In place of the calcium sulphate, I can use an equivalent salt of calcium of an acid which is innocuous to yeast growth or a suitable innocuous salt of magnesium. In place of potassium chlorate any similar chlorate salt can be used which is innocuous to yeast growth.

I do not wish to restrict the scope of my invention to the exact proportions and to the mineral salts enumerated above. In place of sulphates, I can use soluble phosphates, chlorides, and salts of other suitable acids.

I claim:

1. A process for use in the manufacture of leavened bread which consists in supplying to the dough batch sufficient yeast-assimilable carbohydrate material to enable the yeast to carry on the fermentation, yeast and a water soluble, yeast-assimilable substance containing organic nitrogen, the residue of which when the nitrogen is consumed by the yeast does not materially affect the strength of the gluten, fermenting the dough, molding into loaves and baking.

2. A process for use in the manufacture of leavened bread which consists in adding to the dough batch an amount of yeast normally insufficient to ferment the dough in a given time period, and supplying to the dough batch sufficient yeast-assimilable carbohydrate material to enable the yeast to carry on the fermentation, and a water soluble, yeast-assimilable substance containing organic nitrogen, the residue of which when the nitrogen is consumed by the yeast does not materially affect the strength of the gluten and fermenting the dough in the usual period of time.

3. A process for use in the manufacture of leavened bread which consists in adding to the dough batch the usual amount of yeast required for fermentation, and supplying to the dough batch sufficient yeast-assimilable carbohydrate material to enable the yeast to carry on the fermentation, and a water soluble, yeast-assimilable substance containing organic nitrogen, the residue of which when the nitrogen is consumed by the yeast does not materially affect the strength of the gluten, and fermenting the dough in a shorter period of time than usually required.

4. A process for use in the manufacture of leavened bread which consists in supplying to the dough batch sufficient yeast-assimilable carbohydrate material to enable the yeast to carry on the fermentation, yeast, carbamid, fermenting the dough, molding into loaves and baking.

5. A process for use in the manufacture of leavened bread which consists in adding to the dough batch an amount of yeast normally insufficient to ferment the dough in a given time period, and supplying to the dough batch sufficient yeast-assimilable carbohydrate material to enable the yeast to carry on the fermentation, and carbamid, and fermenting the dough.

6. A process for use in the manufacture of leavened bread which consists in supplying to a dough batch sufficient yeast-assimilable carbohydrate material to enable the yeast to carry on fermentation, yeast, carbamid in combination with an innocuous salt of an alkaline earth metal, and an oxidizing compound of chlorine.

7. A process for use in the manufacture of leavened bread which consists in supplying to a dough batch sufficient yeast-assimilable carbohydrate material to enable the yeast to carry on fermentation, yeast, carbamid in combination with magnesium salts, and an oxidizing compound of chlorine.

8. A process for use in the manufacture of leavened bread which consists in supplying to a dough batch sufficient yeast-assimilable carbohydrate material to enable the yeast to carry on fermentation, yeast, carbamid, magnesium sulphate and potassium chlorate.

9. A process for use in the manufacture of leavened bread which consists in supplying to a dough batch sufficient yeast-assimilable carbohydrate material to enable the yeast to carry on fermentation, carbamid, magnesium sulphate, potassium chlorate and an amount of yeast normally insufficient to ferment the dough in a given time period and fermenting the dough in the usual period of time.

10. A new composition of matter comprising a mixture of carbamide in combination with an innocuous salt of an alkaline earth metal and an oxidizing salt of chlorine to be used in connection with yeast-assimilable carbohydrates in dough fermentation.

11. A new composition of matter comprising a mixture of carbamide in combination with potassium chlorate, magnesium sulphate to be used with yeast and assimilable carbohydrates in dough fermentation.

Signed at Chicago, county of Cook and State of Illinois, this 12th day of December, 1925.

ALBERT K. EPSTEIN.